United States Patent [19]

Geiger

[11] 3,994,460

[45] Nov. 30, 1976

[54] DISPLAY STAND

[75] Inventor: Fred G. Geiger, Chicago, Ill.

[73] Assignee: Amity Leather Products Company, West Bend, Wis.

[22] Filed: Oct. 31, 1975

[21] Appl. No.: 627,560

[52] U.S. Cl. .................................. 248/176; 211/13; 206/44 R

[51] Int. Cl.[2] .......................................... F16M 11/00

[58] Field of Search ........... 248/176, 450, 442, 453; 211/13, 40, 41, 42; 40/125 H, 120, 124.1, 152.1; 206/44 R, 45.14, 73; D6/85, 188

[56] References Cited

UNITED STATES PATENTS

| | | | |
|---|---|---|---|
| 1,440,509 | 1/1923 | Townsend | 40/152.1 |
| 1,681,586 | 8/1928 | Kessler | 40/125 H |
| 2,499,535 | 3/1950 | Spreen | 40/152.1 |
| 3,879,874 | 4/1975 | Broussard | 40/152.1 |
| D112,259 | 11/1938 | Logan | 206/45.14 |
| D167,518 | 8/1952 | Kurschner | D6/188 |
| D221,626 | 8/1971 | Fine | 206/44 R |

*Primary Examiner*—Robert A. Hafer
*Attorney, Agent, or Firm*—James E. Nilles

[57] ABSTRACT

A one-piece decorative display stand intended for use in displaying a variety of alternative types of merchandise items such as billfolds or the like in any number of generally vertically upstanding positions such that the item displayed is presented in an attractive manner to consumers. The display stand is generally comprised of a molded body which has a plurality of grooves for receiving billfolds, wallets or the like and for supporting them in a generally vertical position. The configuration of the grooves in the display stand is particularly designed to receive products either in an opened or closed position to receive diverse products. The display stand also has an attractive geometric configuration such that it is useful as an advertising means.

5 Claims, 6 Drawing Figures

DISPLAY STAND

BACKGROUND OF THE INVENTION

The present invention pertains to a display device for use in supporting merchandise items in an attractive manner and for use in retailing establishments as a marketing means. More particularly, the present invention pertains to display stands which are designed to support billfolds or the like.

SUMMARY OF THE INVENTION

The present invention provides an improved and attractive display stand for displaying billfolds, wallets, etc. which is functional to support a wide variety of different types of such retail items and which precludes the necessity of a different type of display stand for use with each different type of merchandise item. The display stand of the present invention is generally comprised of a one-piece transparent plastic molded body which includes a plurality of grooves which are capable of receiving and supporting billfolds, wallets and the like. The stand is particularly designed to have an attractive geometric configuration and also to provide a special arrangement of grooves which are capable of receiving a variety of alternative types of billfolds and wallets in various positions. For example, the stand includes means for displaying such diverse items as tri-folds, wallets, clutch purses and attache's and in varied positions such that their desirable features can be displayed.

The display stand of the invention thus presents a versatile means for merchandising which is thus adaptable to meet the needs of a retailer and avoids the need of a large number of display means.

DESCRIPTION OF THE PREFERRED EMBODIMENT

Figure 1:
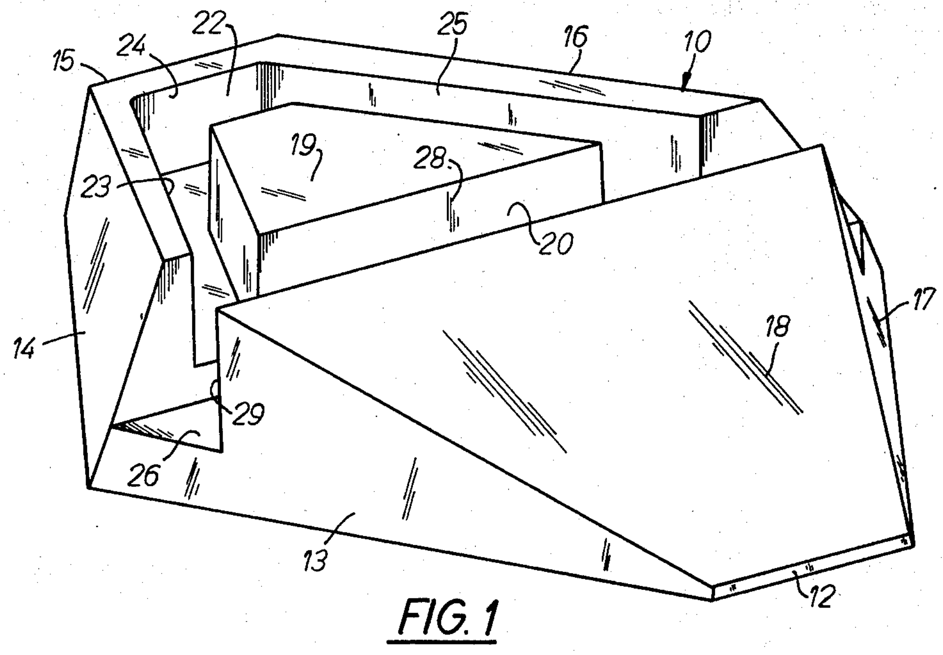
FIG. 1 is an isometric view of the one-piece molded display stand of the present invention.
Figure 2:
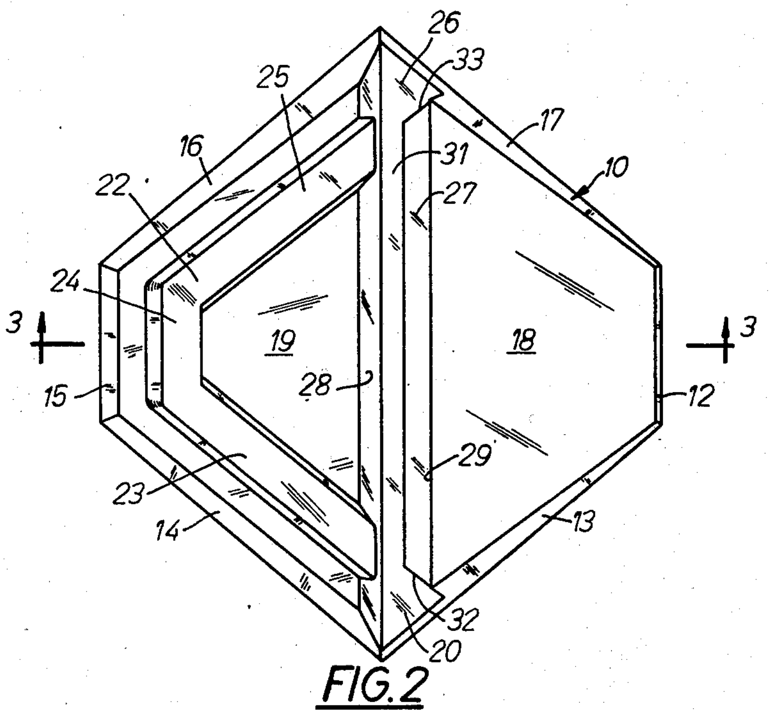
FIG. 2 is a plan view of the display stand shown in FIG. 1.
Figure 3:
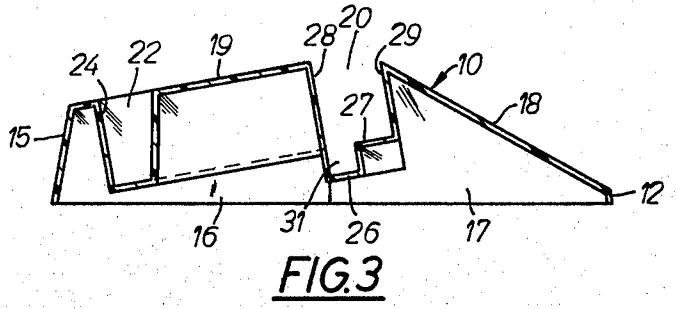
FIG. 3 is a cross-sectional view taken along the line 3—3 in FIG. 2.

The display stand 10 of the present invention which is shown in FIG. 1 is preferably comprised of a one-piece injection molded body formed from generally transparent plastic and is particularly designed to provide a decorative means for displaying any of a variety of different types of billfolds, wallets, etc. such that they are attractively displayed. The display stand includes a hexagonally shaped base comprised of side walls 12, 13, 14, 15, 16 and 17. The side walls 12-17 have varied heights and generally taper upwardly and inwardly. The display stand also includes a ramped front surface 18 which is quadralateral and which slopes upwardly and rearwardly. The surface 18 is bounded by the sidewalls 12, 13 and 17 and by an upwardly opening groove 20 which extends transversely across the display stand. A second upper planar surface 19 bounded by the side walls 14, 15 and 16 extends rearwardly from the transversely extending groove 20 and slopes slightly downwardly as it extends rearwardly.

Figure 5:
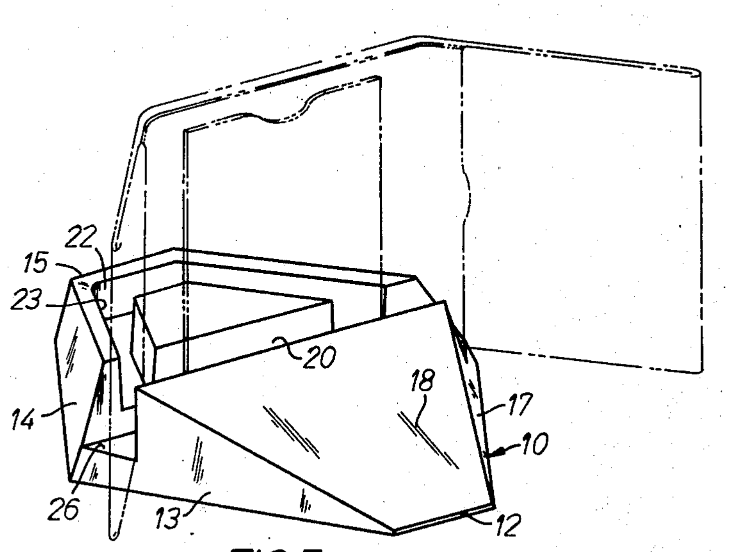
FIGS. 5 and 6 are views similar to FIG. 4 but showing alternative uses of the stand.
Figure 6:
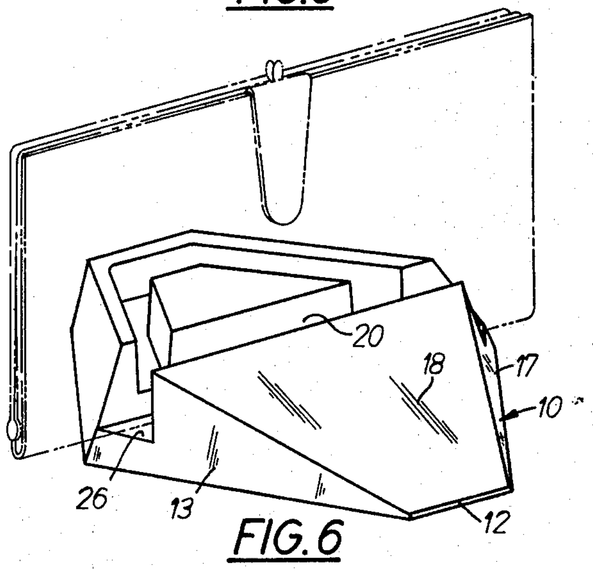

The groove 20 which is designed to support merchandise items in generally vertically oriented relationship includes a slightly rearwardly sloping planar rear wall 28 and a stepped bottom wall 26. The groove also includes a front wall 29 parallel to the rear wall 28. The stepped bottom wall 26 of the groove 20 includes a transversely extending raised section 27 which is adjacent to the front wall 29. The raised section 27 and the rear wall 28 define a secondary groove 31 therebetween. The ends 32 and 33 of the raised section 27 are truncated to define planes generally parallel to the side walls 14 and 16 respectively. The groove 20 may be used, for example, for supporting either a tri-fold wallet, as shown in FIG. 5, or a clutch purse held in closed relationship, as shown in FIG. 6. The secondary groove 31 is particularly useful for receiving the center section of the tri-fold wallet and the ends 32 and 33 of the raised section 27 are truncated to permit the two ends of the tri-fold wallet to extend in a somewhat forward direction. It should be readily apparent that the slot 20 is not limited for use in supporting only the types of wallets shown in FIGS. 5 and 6 but can be used to support any of a wide variety of types of merchandise items and that they can be supported in either an open or in a closely folded position. In summary, the shape of the groove 20 and the secondary groove 31 are particularly advantageous in that they provide means for securely supporting both thin and thick items. If an item is relatively thin with respect to the width of the groove 20, it can be securely received within the secondary groove 31. On the other hand, relatively thick items such as a clutch purse or folded billfold will be secured in the wider portion of the groove 20.

Figure 4:
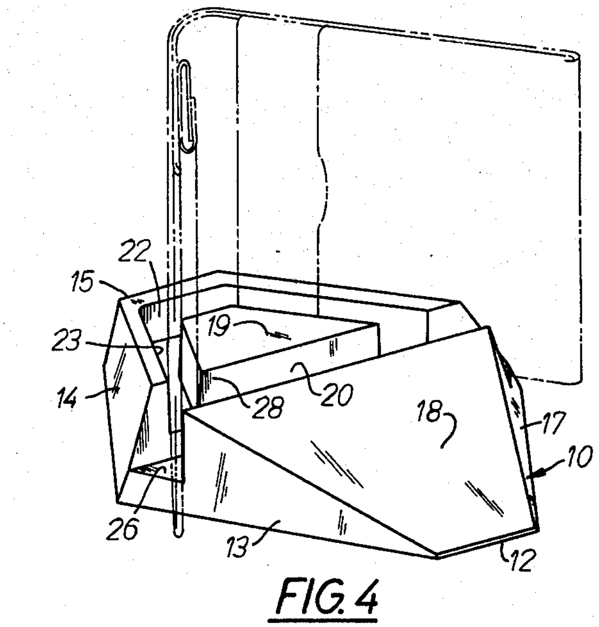
FIG. 4 is an isometric view similar to that of FIG. 1 but showing the stand supporting a billfold in an opened position.

The display stand 10 also includes a second upwardly opening slot or groove 22 which is generally V-shaped and which includes three sections 23, 24 and 25 respectively parallel to the side walls 14, 15 and 16. The V-shaped groove 22 slopes rearwardly and downwardly and is particularly adapted to support a billfold or wallet and the like in a vertical and open position as shown in FIG. 4. The ends of the slot 22 intersect the slot 20 at positions closely adjacent to the ends of the slot 20 such that the ends of a wallet supported in the manner shown in FIG. 4 can extend beyond the side walls 13 and 17. Though the V-shaped slot shown in FIG. 4 is illustrated as supporting a mens billfold in an open position, it should be readily apparent that the slot is similarly adaptable to support thicker ladies billfolds or clutch purses and attache's positioned in a similarly open arrangement. Both of the slots 20 and 22 are of sufficient depth that a wallet may be vertically supported therein but permit a substantial portion of the wallet to project therefrom so that the features of the wallet are not obscured from view.

RESUME

The display stand of the present invention is thus specially adapted to support a plurality of varied types of billfolds or wallets and the like such that they can be displayed in an attractive manner. The display stand is also particularly useful in that it is designed to receive a large variety of such merchandise items and to display them in any number of alternative arrangements.

I claim:

1. A decorative display stand for displaying a billfold or the like in a plurality of alternative generally vertically upstanding positions, said stand comprising a molded body having a generally flat undersurface for support thereof, said body having a generally transverse groove extending therethrough for the reception of said billfold and for positioning the latter in a transverse, generally vertical position, said stand also includng supporting means for supporting said billfold or the like in partially open position and in a generally upstanding direction wherein the interior of said billfold can be viewed, said supporting means including a generally U-shaped groove, when viewed in plan, said U-shaped groove formed between the adjacent surfaces of two generally U-shaped formations integral with said molded body.

2. The decorative display stand set forth in Claim 1 wherein said U-shaped groove includes opposite ends which intersect opposite ends of said transverse groove.

3. A decorative display stand for displaying a billfold or the like in a plurality of alternative generally vertically upstanding positions, said stand comprising a molded body having a generally flat undersurface for support thereof, said body having a generally transverse groove extending therethrough for the reception of said billfold and for positioning the latter in a transverse, generally vertical position, said stand also having a generally U-shaped groove, when viewed in plan, for supporting said billfold or the like in partially open position and in a generally upstanding direction wherein the interior of said billfold can be viewed, said transverse groove including a narrower groove therein whereby billfolds or the like of different thicknesses can be securely supported within said transverse groove.

4. The decorative display stand set forth in claim 1 wherein said transverse groove is rearwardly inclined whereby said billfold received therein will be rearwardly inclined.

5. A one-piece molded display stand for displaying a billfold or the like in a plurality of alternative generally vertically upstanding positions, said stand comprising a one-piece molded body having a generally flat undersurface for support thereof, said body having a generally transverse groove extending therethrough for the reception of said billfold and for positioning the latter in a transverse, generally vertical position, said transverse groove including a narrower groove therein whereby billfolds or the like of different thicknesses can be securely supported within said transverse groove, and said transverse groove being rearwardly inclined whereby said billfold received therein will be rearwardly inclined, said stand also having a generally U-shaped groove, when viewed in plan, for supporting said billfold or the like in partially open position and in a generally upstanding direction wherein the interior of said billfold can be viewed, said U-shaped groove including opposite ends which intersect opposite ends of said transverse groove.

* * * * *